(12) United States Patent
Marsolek

(10) Patent No.: US 10,228,293 B2
(45) Date of Patent: Mar. 12, 2019

(54) CONTROL SYSTEM FOR DETERMINING TEMPERATURE OF PAVING MATERIAL

(71) Applicant: Caterpillar Paving Products Inc., Brooklyn Park, MN (US)

(72) Inventor: John Lee Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/592,498

(22) Filed: May 11, 2017

(65) Prior Publication Data

US 2018/0328795 A1 Nov. 15, 2018

(51) Int. Cl.
| | | |
|---|---|---|
| *G01K 13/02* | (2006.01) | |
| *E01C 19/48* | (2006.01) | |
| *G01J 5/10* | (2006.01) | |
| *G01J 5/00* | (2006.01) | |

(52) U.S. Cl.
CPC .......... *G01K 13/02* (2013.01); *E01C 19/4873* (2013.01); *G01J 5/0003* (2013.01); *G01J 5/10* (2013.01); *E01C 2301/10* (2013.01)

(58) Field of Classification Search
CPC ........ E01C 19/29; E01C 19/405; E01C 19/48; E01C 19/40; E01C 23/14; E01C 2019/207; E01C 19/4873; E01C 2301/10
See application file for complete search history.

(56) References Cited

U.S. PATENT DOCUMENTS

| | | | | |
|---|---|---|---|---|
| 5,747,777 | A * | 5/1998 | Matsuoka | .......... G03G 15/2003 219/497 |
| 5,857,804 | A * | 1/1999 | Musil | ...................... E01C 19/48 404/104 |
| 6,749,364 | B1 * | 6/2004 | Baker | ................... E01C 19/288 404/118 |
| 8,827,591 | B2 * | 9/2014 | Begley | ..................... E01C 19/48 404/118 |
| 8,936,145 | B2 | 1/2015 | Buschmann et al. | |
| 8,944,719 | B2 | 2/2015 | Frelich et al. | |
| 9,068,295 | B2 * | 6/2015 | Rutz | ....................... E01C 19/00 |
| 2010/0080655 | A1 * | 4/2010 | Munz | ..................... E01C 19/48 404/118 |
| 2012/0163913 | A1 * | 6/2012 | Everett | ............. B65G 69/0433 404/101 |

(Continued)

OTHER PUBLICATIONS

Moba Automation, Pave-IR, Jan. 2017, http://moba-automation.com/fileadmin/Documents/Brochures/Paving_Quality/Brochure_Pave-IR_EN.pdf (Year: 2017).*

*Primary Examiner* — Abigail A Risic
(74) *Attorney, Agent, or Firm* — Schwegman, Lundberg & Woessner

(57) ABSTRACT

A control system for determining a core temperature of a paving material being paved by a paving machine includes at least one temperature sensor. The temperature sensor generates data indicative of a temperature of the paving material at an auger assembly. The control system further includes a controller in communication with the temperature sensor. The controller receives the data indicative of the temperature of the paving material from the temperature sensor. Further, the controller determines the core temperature of the paving material based on the temperature of the paving material at the auger assembly.

19 Claims, 5 Drawing Sheets

(56) References Cited

U.S. PATENT DOCUMENTS

| | | | |
|---|---|---|---|
| 2012/0288328 A1* | 11/2012 | Minich | E01C 23/07 |
| | | | 404/72 |
| 2013/0322964 A1* | 12/2013 | Buschmann | E01C 19/48 |
| | | | 404/77 |
| 2014/0046488 A1 | 2/2014 | Eul et al. | |
| 2014/0086684 A1* | 3/2014 | Sehr | G01D 21/02 |
| | | | 404/84.05 |
| 2016/0060819 A1* | 3/2016 | Oetken | E01C 19/002 |
| | | | 404/72 |
| 2017/0058467 A1* | 3/2017 | Marsolek | E01C 19/1063 |

\* cited by examiner

CONTROL SYSTEM FOR DETERMINING TEMPERATURE OF PAVING MATERIAL

TECHNICAL FIELD

The present disclosure relates to a control system for a paving machine. More specifically, the present disclosure relates to the control system for determining a core or a surface temperature of a paving material being laid by the paving machine.

BACKGROUND

A paving machine, such as an asphalt paver, is a self-propelled construction machine designed to receive, convey, distribute, profile, and partially compact the asphalt material. The paving machine accepts asphalt material that is heated to an appropriate temperature for flow and even spreading into a receiving hopper at front of the paving machine. The asphalt material in the hopper is conveyed to rear of the paving machine with conveyors positioned at a bottom of the hopper. The asphalt material conveyed from the hopper is distributed by means of two opposing screws or spreading conveyors or augers, and a screed assembly profiles and compacts the asphalt material into a mat on the paving surface.

Preferably, the paving material mat is formed such that the material is within a desired temperature band. It may be possible that different sections of the paving material mat may have different temperatures. Consequently, the compaction requirements of the different sections may be different as well. It would be desirable to provide a system to estimate temperature of the paving material mat accurately, such that the temperature information may be used by an operator or a controller to make appropriate adjustments to the operating parameters of the paving machine. The temperature data of the paving material mat may be used for various other purposes as well. There are various methods to measure the temperature of the paving material mat. An exemplary method may include using an infrared camera or a thermal imaging camera. However, using an infrared camera or a thermal imaging camera may add considerable additional costs to the paving machine.

U.S. Pat. No. 8,936,145 (hereinafter referred to as '145 reference) describes a material conveyor system for improving temperature homogeneity in asphalt mixture for providing better compaction. The '145 reference includes a temperature measurement system which monitors temperature of the asphalt in main conveyor flow and/or of transverse conveyor flow for controlling the asphalt flow. However, the '145 reference does not disclose details about estimating the temperature of the paving material mat.

Therefore, an improved system for determining the temperature of the paving material mat is required.

SUMMARY

In an aspect of the present disclosure, a control system for determining a core temperature of a paving material being paved by a paving machine is provided. The control system includes at least one temperature sensor which generates a data indicative of a temperature of the paving material at an auger assembly. The control system further includes a controller in communication with the temperature sensor. The controller receives the data indicative of the temperature of the paving material from the temperature sensor. Further, the controller determines the core temperature of the paving material based on the temperature of the paving material at the auger assembly.

In another aspect of the present disclosure, a method for determining a core temperature of a paving material paved by a paving machine is disclosed. The method includes receiving data indicative of a temperature of a paving material at an auger assembly through a controller. The method further includes determining the core temperature of the paving material based on the temperature of the paving material at the auger assembly through the controller.

In yet another aspect of the present disclosure, a paving machine includes a tractor portion, and a hopper coupled to the tractor portion. The hopper receives a paving material. The machine includes an auger assembly coupled to the tractor portion. The machine includes a conveyor system which conveys the paving material from the hopper to the auger assembly. The machine includes at least one temperature sensor which generates data indicative of a temperature of the paving material at the auger assembly. The machine further includes a controller in communication with the temperature sensor. The controller receives the data indicative of the temperature of the paving material from the temperature sensor. Further, the controller determines a core temperature of the paving material based on the temperature of the paving material at the auger assembly.

DETAILED DESCRIPTION

Figure 1:
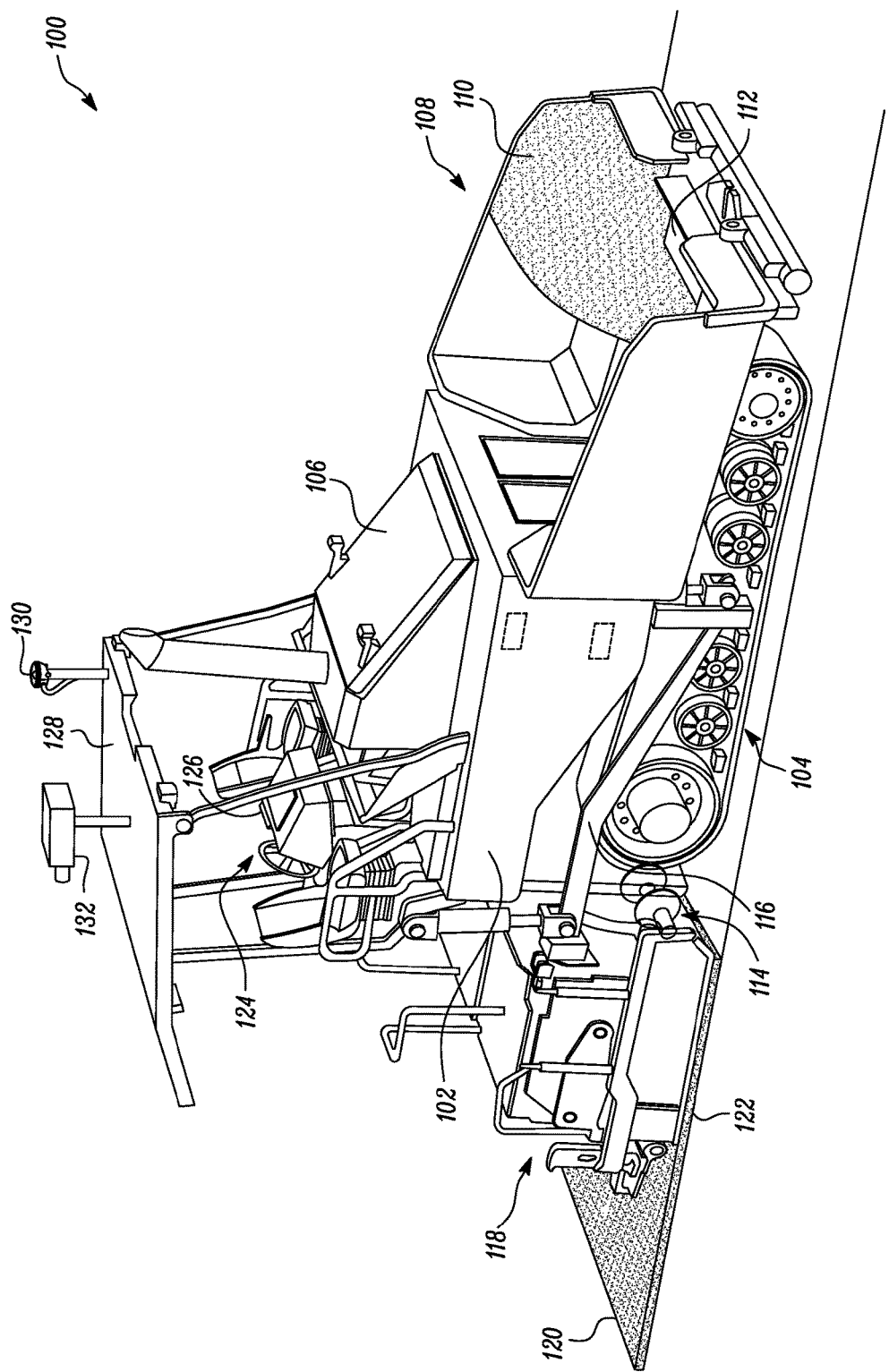
FIG. 1 is a perspective view of a paving machine having a control system, in accordance with an embodiment of the present disclosure.

Wherever possible, the same reference numbers will be used throughout the drawings to refer to same or like parts. FIG. 1 shows an exemplary machine 100. The machine 100 is illustrated as a paving machine 100 which may be used, for example, for road or highway constructions and other allied industries. Alternatively, the machine 100 may be any other machine used for laying asphalt, concrete, or like materials. While the following detailed description describes an exemplary aspect in connection with the paving machine 100, it should be appreciated that the description applies equally to the use of the present disclosure in other machines as well.

The paving machine 100 includes a tractor portion 102 supported on a set of ground-engaging elements 104. The tractor portion 102 includes a power source 106 for driving the ground-engaging elements 104. Although, the ground engaging elements 104 are illustrated as continuous tracks, it should be contemplated that the ground engaging elements 104 may be any other type of ground engaging elements as well, for example, wheels etc. The power source 106 may be a conventional internal combustion engine operating on fossil or hybrid fuels, or an electrically operated drive powered by alternate energy sources. The paving machine 100 includes a hopper 108 for storing a paving material 110. The paving machine 100 includes a conveyor system 112 for conveying the paving material 110 from the hopper 108, to deposit the paving material 110 on a paving surface 122. The paving machine 100 further includes an auger assembly 114 which receives the paving material 110 supplied via the conveyor system 112, and distributes the paving material 110 on the paving surface 122. The paving machine 100 further includes a tow arm 116 which couples a height adjustable screed portion 118 with the tractor portion 102 so as to spread and compact the paving material 110 into a mat 120 on the paving surface 122. The tow arm 116 may be actuated by a hydraulic actuator, or an electric actuator (not shown) or any other type of actuator as per application requirements.

Further referring to FIG. 1, an operator station 124 is coupled to the tractor portion 102. The operator station 124 includes a console 126 and other levers or controls (not shown) for operating the paving machine 100. The console 126 includes a control interface (not shown) for controlling various functions of the paving machine 100. The control interface may include an analog or a digital or a touchscreen control interface. The control interface may also support other allied functions, including for example, sharing various operating data with one or more other machines (not shown) operating in consonance with the paving machine 100.

As shown, the operator station 124 includes a roof 128. A communication device 130 and a camera 132 are coupled to the roof 128. The communication device 130 is capable of providing details of a location of the paving machine 100 by using a global positioning system (GPS). In an embodiment, the communication device 130 enables the paving machine 100 to communicate with the one or more other machines. The camera 132 may be a state of the art camera capable of providing visual feeds and supporting other functional features of the paving machine 100.

Figure 2:
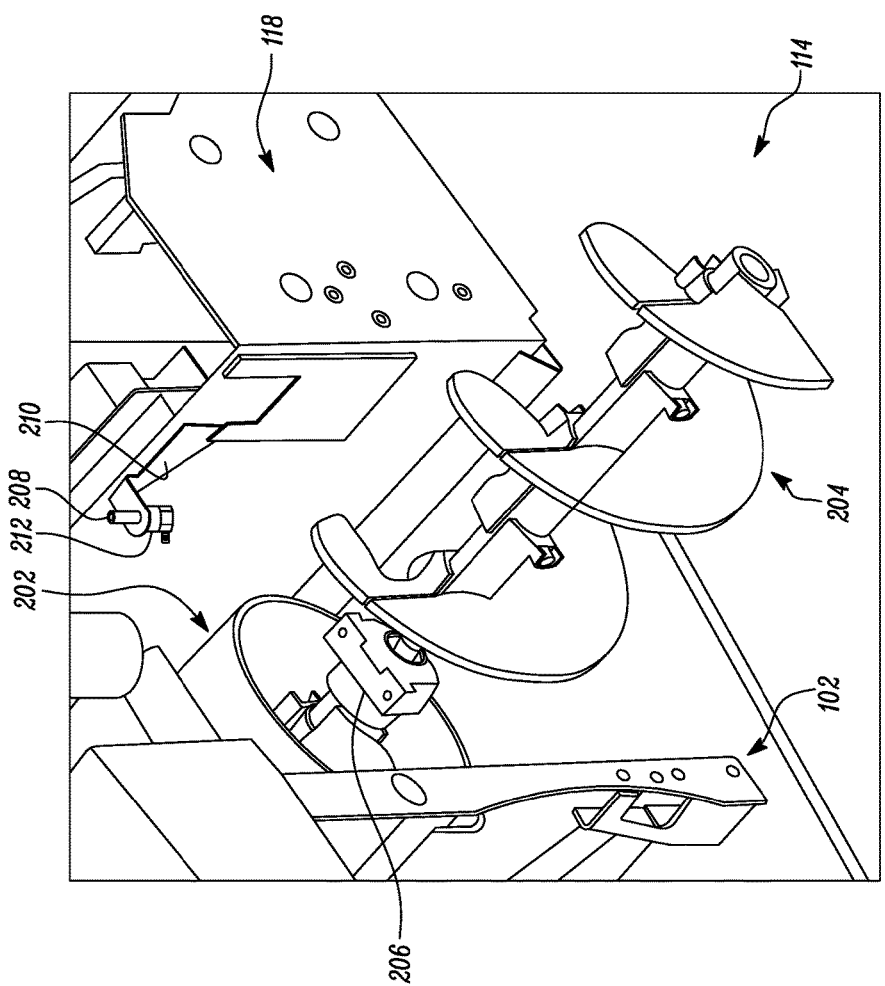
FIG. 2 is a zoomed-in top elevational view of an auger assembly of the paving machine of FIG. 1, in accordance with an embodiment of the present disclosure.

Now referring to FIG. 2, a zoomed-in view of the surroundings of the auger assembly 114 is shown. In an embodiment, the auger assembly 114 includes a main auger 202 and an auger extension 204 coupled via an auger bearing 206. In some embodiments, the auger assembly 114 may only include the main auger 202. Further as shown, a temperature sensor 208 is coupled to a coupling means 210 attached to the tractor portion 102. Although, the coupling means 210 is illustrated as a bracket, it must be appreciated that there may be other coupling means for coupling the temperature sensor 208 to the tractor portion 102 as well. In some embodiments, the temperature sensor 208 may be coupled with the screed portion 118 by welding, bolting, or any other such methods known in the art. In an embodiment, the temperature sensor 208 may include multiple temperature sensors 208 coupled to the paving machine 100 at multiple positions. The temperature sensor 208 may be a mechanical, electrical, electro-mechanical, electronic, or any other type of a temperature sensor known in the art. In the illustrated embodiment, the temperature sensor 208 includes an air purge device 212 to prevent debris from forming on the temperature sensor 208. The air purge device 212 may receive purge air from an air source storing pressurized air to prevent any dirt, debris etc. which may stick to the temperature sensor.

Figure 3:
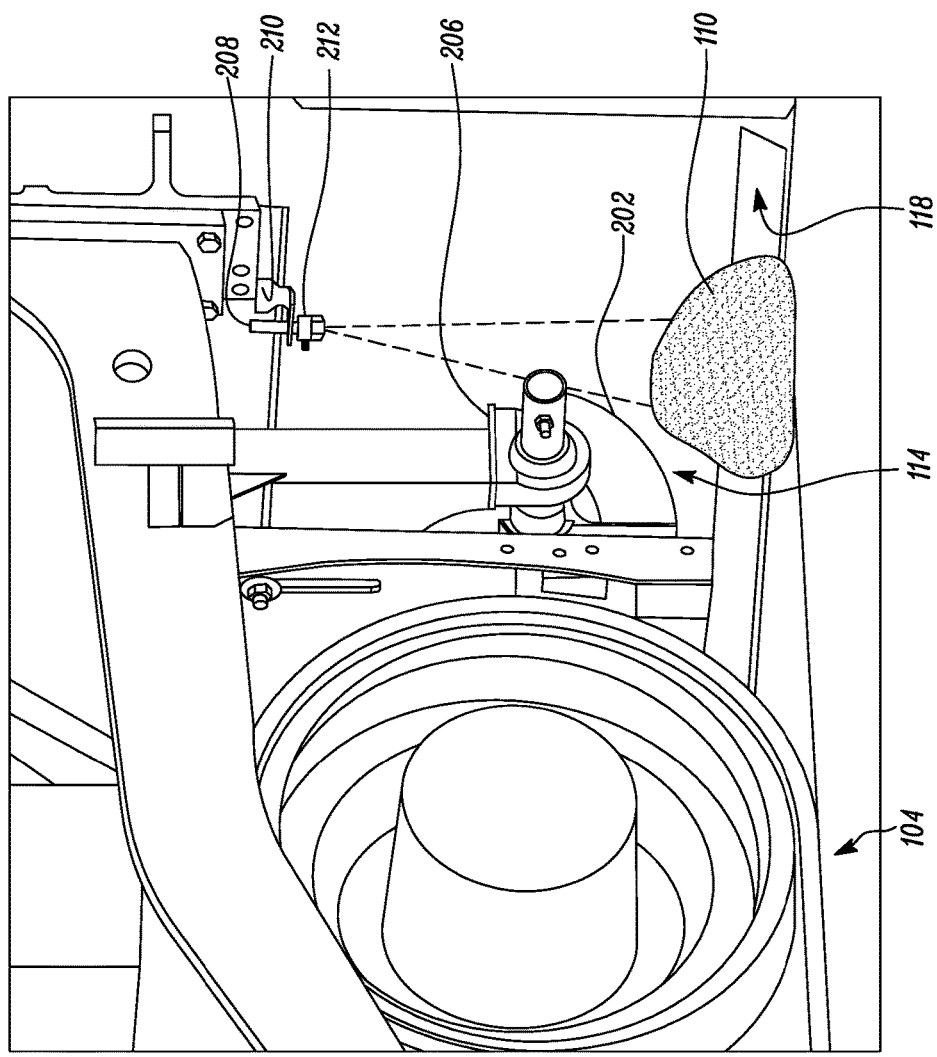
FIG. 3 is zoomed-in side elevational view of a temperature sensor of the control system of the paving machine, in accordance with an embodiment of the present disclosure.

Further referring to FIGS. 2 and 3, the temperature sensor 208 measures a temperature T1 of the paving material 110 at the auger assembly 114. In the illustrated embodiment, the temperature sensor 208 is positioned in such a manner that the temperature sensor 208 measures the temperature T1 of the paving material 110 at the auger assembly 114. In some embodiments, the temperature sensor 208 may also be positioned in a manner that the temperature sensor 208 may measure the temperature T1 of the paving material 110 at the auger bearing 206. The temperature sensor 208 generates data indicative of the temperature T1 of the paving material 110 at the auger assembly 114.

As shown in FIG. 3, a cutaway view of FIG. 2 is depicted with the auger extension 204 removed and only the main auger 202 visible. It should be contemplated that the auger extension 204 is removed only for illustrative purposes, and the auger extension 204 remains an integral part of the auger assembly 114. In the illustrated embodiment, the temperature sensor 208 is an infrared sensor which measures the temperature T1 of the paving material 110 at the auger assembly 114, by measuring infrared radiations being emitted by the paving material 110. In some embodiments, the temperature sensor 208 may measure the temperature T1 just before the paving material 110 is processed by the screed portion 118. In an embodiment, more than one temperature sensors 208 may be used to measure the temperature T1 of the paving material 110 at the auger assembly 114.

Figure 4:
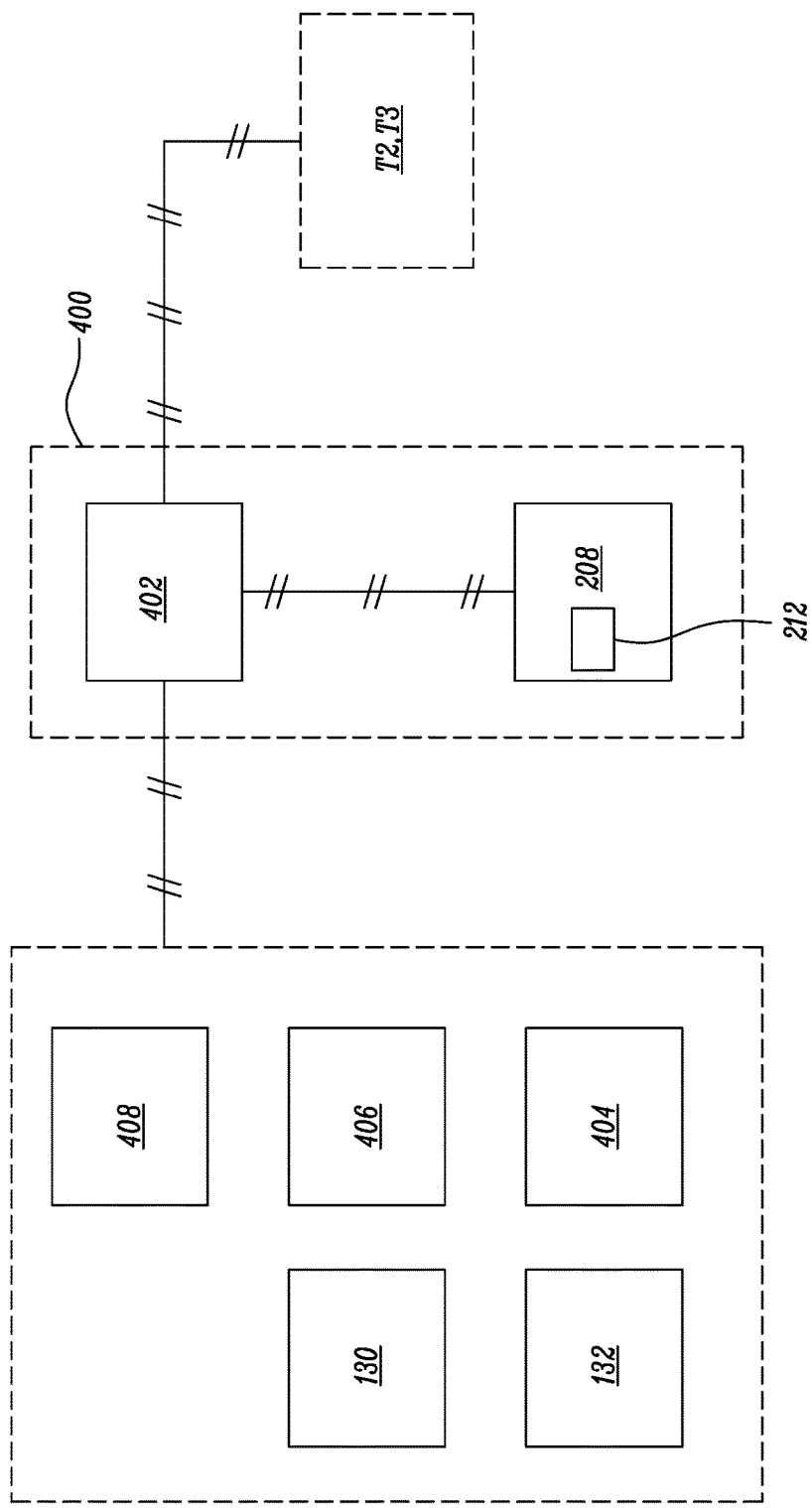
FIG. 4 is a block diagram schematically representing the control system of the paving machine, in accordance with an embodiment of the present disclosure.

With reference to FIG. 4, a control system 400 includes the temperature sensor 208 and a controller 402. The controller 402 may be a single controller or multiple controllers working together to perform a variety of tasks. The controller 402 may embody a single or multiple microprocessors, field programmable gate arrays (FPGAs), digital signal processors (DSPs), etc., that include a means for calculating the core temperature as well as the surface temperature of the paving surface 122 in response to operator requests, built-in constraints, sensed operational parameters, and/or communicated instructions from an off-board controller (not shown). Numerous commercially available microprocessors can be configured to perform the functions of the controller 402. Various known circuits may be associated with the controller 402, including power supply circuitry, signal-conditioning circuitry, actuator driver circuitry (i.e., circuitry powering solenoids, motors, or piezo actuators), and communication circuitry.

As illustrated in FIG. 4, the controller 402 is in communication with the communication device 130 and the camera 132. The controller 402 is also in communication with an ambience sensor 404 which generates signals indicative of ambient conditions such as ambient temperature, pressure etc., a ground sensor 406 which generates signals indicative of ground temperature, and a screed activation sensor 408 which generates signals indicative of an activation time of the screed portion 118. It should be contemplated that the control system 400 may include various other sensors to measure various other parameters related to the paving machine 100 as well. In an embodiment, the control system 400 is positioned onboard the paving machine 100. In some embodiments, the control system 400 may be positioned at an off-board location relative to the paving machine 100. The present disclosure, in any manner, is not restricted to the type of controller 402, as well as the positioning of the controller 402 relative to the paving machine 100.

With combined reference to FIG. 1-4, the controller 402 receives signals indicative of the temperature T1 of the paving material 110 at the auger assembly 114 from the temperature sensor 208 and determines the core temperature T2 of the paving material 110 based on the temperature T1.

The controller 402 may determine the core temperature T2 of the paving material 110 by extrapolating the temperature T1. In an exemplary embodiment, the controller 402 may have an associated memory in which various extrapolation models may be stored for determining the core temperature T2 of the paving material 110 based on the temperature T1 of the paving material 110 at the auger assembly 114. The controller 402 may further determine the surface temperature T3 of the paving surface 110 as placed. It should be contemplated that the controller 402 may determine the core temperature T2 and the surface temperature T3 based on the temperature T1 in any other manner as well, which may suit the application requirements for the present disclosure.

In an embodiment, the controller 402 may utilize at least one of an ambient temperature T4 measured by the ambience sensor 404, a ground temperature T5 measured by the ground sensor 406, and the screed activation sensor 408, for determining the core temperature T2 of the paving material 110, in addition to the temperature T1. In an embodiment, the screed activation sensor 408 may determine a first pre-determined time PT1 since the paving machine 100 started paving, and/or a second pre-determined time PT2 since a heating function of the screed portion 118 is activated. In some embodiments, the controller 402 may utilize at least one of the ambient temperature T4, the ground temperature T5, the first pre-determined time PT1, and the second pre-determined time PT2 for determining the surface temperature T3 of the paving material 110. The ambient temperature T4, the ground temperature T5, the pre-determined time PT1, the pre-determined time PT2 may all be used by the controller 402 to further refine the determination of the core temperature T1, and the surface temperature T3. It may be contemplated that additional data, for example, a wind speed, a pavement thickness, and a cloud cover information etc. may also be used by the controller 402 to improve the surface temperature T3. The wind speed, the pavement thickness, and the cloud cover information may be obtained from either machine equipped sensors or via off-board data sources.

An exemplary work cycle of the paving machine 100 may include receiving the paving material 110 in the hopper 108, distributing the paving material 110 by using the auger assembly 114, and compacting the paving material 110 into the mat 120 by using the screed portion 118. As the controller 402 receives each of the operating data for example, the measured temperature T2, the ambient temperature T4, and the ground temperature T5, the controller 402 determines the core temperature T2 of the mat 120 of the paving material 110. Further, the controller 402 may also add a geo-reference or location data, and/or a time-stamp to the core temperature T3. The controller 402 may adjust the paving or compacting parameters accordingly to operate the paving machine 100 in a more efficient manner. The controller 402 may also share the determined core temperature T2 and the surface temperature T3 with the one or more other machines. The controller 402 may also share the geo-referenced, and/or time-stamped core temperature T3 with the one or more machines. The one or more machines may adjust their paving or compacting parameters based on the core temperature T2 and the surface temperature T3.

INDUSTRIAL APPLICABILITY

Figure 5:
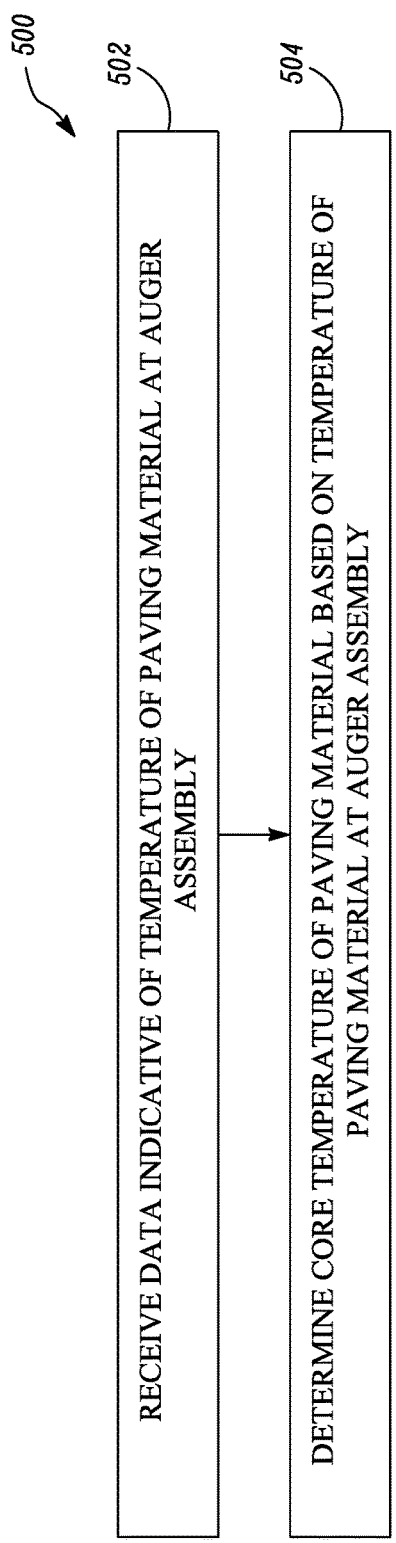
FIG. 5 is a flow chart depicting a method for controlling the paving machine, in accordance with an embodiment of the present disclosure.

The present disclosure provides a method for determining the core temperature T2 of the paving material 110 so as to achieve better paving and compacting performances. A method 500 for determining the core temperature T2 of the paving material 110 being paved by the paving machine 100 is illustrated with the help of FIG. 5. In an embodiment, the paving machine 100 is switched on, and is operating to pave the mat 120. The controller 402 may direct the air purge device 212 to blow air on face of the temperature sensor 208 for cleaning it. The temperature sensor 208 generates data indicative of the temperature T1 and communicates it to the controller 402. The method 500 at step 502 includes receiving the data indicative of the temperature T1 through the controller 402. The method 500 at step 504 determines the core temperature T2 of the paving material 110 based on the temperature T1 through the controller 402.

Additionally, the method 500 may include determining the surface temperature T3 of the paving material 110 based on the temperature T1 of the paving material 110 at the auger assembly 114, through the controller 402. The data indicating the core temperature T2 or the surface temperature T3 may be further improved by utilizing at least one of the ambient temperature T4, the ground temperature T5 etc. for determining the core temperature T2 of the paving material 110. The method 500 may be further revised by determining whether the first pre-determined time PT1 has passed since the paving machine 100 started paving, before determining the core temperature T2 by the controller 402. In some embodiments, the method 500 includes determining whether the second pre-determined time PT2 has passed since the heating function of the screed portion 118 is activated, before determining the core temperature T2 by the controller. The inclusion of parameters like the ambient temperature T4, the ground temperature T5, the pre-determined time PT1, the pre-determined time PT2 provides more precise values of the core temperature T2 and the surface temperature T3.

The method 500 may further include a step of utilizing the core temperature T2 for changing various paving parameters of the paving machine 100, or for communicating it to the one or more other machines for changing their respective paving or compaction parameters. The determination of the core temperature T2 by the control system 400 of the present disclosure provides a more precise and an improved solution for better paving. Moreover, the provision and use of an infrared sensor as the temperature sensor 208 for determining the core temperature T1 and/or the surface temperature T2 of the mat 120 of the paving material 110 instead of using an infrared camera, or a thermal camera provides considerable savings in terms of cost. The present method further ensures lesser operating and maintenance cost with enhanced precision in measurement of the core temperature T1 and/or the surface temperature T2.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for determining a core temperature of a paving material being paved by a paving machine, the control system comprising:
    at least one temperature sensor configured to generate data indicative of a temperature of a paving material at an auger assembly; and
    a controller communicably coupled with the temperature sensor, the controller configured to:

receive the data indicative of the temperature of the paving material from the temperature sensor; and determine the core temperature of the paving material based on the temperature of the paving material at the auger assembly;

wherein the controller further utilizes at least one of an ambient temperature, a ground temperature, a machine-stopped time and a screed activation sensor for determining the core temperature of the paving material.

2. The control system of claim 1, wherein the control system is further configured to determine a surface temperature of the paving material based on the temperature of the paving material at the auger assembly.

3. The control system of claim 1, wherein the auger assembly includes a main auger and an auger extension operatively coupled to the main auger via an auger bearing.

4. The control system of claim 3, wherein the temperature sensor is positioned such that to measure a temperature of the paving material at the auger bearing.

5. The control system of claim 1, wherein the controller is further configured to communicate the core temperature with one or more other machines.

6. The control system of claim 5, wherein the controller is further configured to add at least one of a geo-reference data, and a time stamp to the determined core temperature, and to communicate the geo-referenced and time stamped core temperature with one or more machines.

7. The control system of claim 2, wherein the controller further utilizes at least one of a wind speed, a pavement thickness, and a cloud cover information to determine the surface temperature of the paving material.

8. A method for determining a core temperature of a paving material being paved by a paving machine, the method comprising:

receiving, through a controller, data indicative of a temperature of a paving material at an auger assembly;

receiving, from a ground temperature sensor, data indicative of a ground temperature; and determining, through the controller; the core temperature of the paving material based on the temperature of the paving material at the auger assembly and based on the ground temperature.

9. The method of claim 8; wherein the method further comprises:

determining, by the controller, a surface temperature of the paving material, based on the temperature of the paving material at the auger assembly.

10. The method of claim 8, wherein the method further comprises:

determining, by the controller, whether a pre-determined time has passed since the machine started paving, before determining the core temperature.

11. The method of claim 8, wherein the method further comprises:

determining, by the controller, whether a pre-determined time has passed since a screed heating function is activated, before determining the core temperature.

12. The method of claim 8, wherein the method further comprises:

adding at least one of a geo-reference and a time stamp to the determined core temperature; and communicating, by the controller, the geo-references and time stamped core temperature of the paving material to one or more other machines.

13. A paving machine comprising:

a tractor portion;

a hopper coupled to the tractor portion, the hopper adapted to receive a paving material;

an auger assembly coupled to the tractor portion;

a conveyor system adapted to convey the paving material from the hopper to the auger assembly;

a screed portion coupled to the tractor portion;

a screed activation sensor configured to produce a screed activation signal based on operating time of the screed portion;

at least one temperature sensor configured to generate data indicative of a temperature of the paving material at the auger assembly, wherein the temperature sensor is coupled to the screed portion; and a controller communicably coupled with the temperature sensor, the controller configured to:

receive the data indicative of the temperature of the paving material from the temperature sensor;

receive the screed activation signal; and determine a core temperature of the paving material based on the temperature of the paving material at the auger assembly and the screed activation signal.

14. The paving machine of claim 13, wherein the controller is further configured to determine a surface temperature of the paving material based on the temperature of the paving material at the auger assembly.

15. The paving machine of claim 14, wherein the controller further utilizes at least one of a wind speed, a pavement thickness, and a cloud cover information to determine the surface temperature of the paving material.

16. The paving machine of claim 13, wherein the auger assembly includes a main auger and an auger extension operatively coupled to the main auger via an auger bearing.

17. The paving machine of claim 13, wherein the temperature sensor is positioned such that to measure a temperature of the paving material at the auger bearing.

18. The paving machine of claim 13, wherein the controller is further configured to add at least one of a geo-reference and a time stamp to the determined core temperature, and communicate the geo-references and time stamped core temperature with one or more machines.

19. The Paving machine of claim 13, further comprising:

a ground sensor configured to produce a ground signal based on a ground temperature; and wherein the controller is further configured to:

receive the ground signal; and determine the core temperature of the paving material based on the temperature of the paving material at the auger assembly, the screed activation signal, and the ground signal.

* * * * *